US012128398B2

(12) United States Patent
Nakajima (10) Patent No.: US 12,128,398 B2
(45) Date of Patent: Oct. 29, 2024

(54) DISPENSER

(71) Applicant: Panasonic Intellectual Property Management Co., Ltd., Osaka (JP)

(72) Inventor: Hisato Nakajima, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 462 days.

(21) Appl. No.: 17/439,890

(22) PCT Filed: Mar. 16, 2020

(86) PCT No.: PCT/JP2020/011545
§ 371 (c)(1),
(2) Date: Sep. 16, 2021

(87) PCT Pub. No.: WO2020/196057
PCT Pub. Date: Oct. 1, 2020

(65) Prior Publication Data
US 2022/0305485 A1 Sep. 29, 2022

(30) Foreign Application Priority Data
Mar. 25, 2019 (JP) .................................. 2019-056950

(51) Int. Cl.
*B01L 3/02* (2006.01)
(52) U.S. Cl.
CPC ....... *B01L 3/0293* (2013.01); *B01L 2200/146* (2013.01); *B01L 2200/16* (2013.01); *B01L 2400/0478* (2013.01)
(58) Field of Classification Search
None
See application file for complete search history.

(56) References Cited

U.S. PATENT DOCUMENTS 6,158,269 A * 12/2000 Dorenkott ................ G01N 1/38
422/562
2007/0177986 A1* 8/2007 Leibfried ........... G01N 35/1009
417/44.2
(Continued)

FOREIGN PATENT DOCUMENTS

JP H09-257805 A 10/1997
JP 2010-025804 A 2/2010

OTHER PUBLICATIONS

Extended European search report issued in European Patent Application No. 20780078.0 dated Feb. 3, 2022.
(Continued)

*Primary Examiner* — P. Kathryn Wright
(74) *Attorney, Agent, or Firm* — Pearne & Gordon LLP (57) ABSTRACT

This dispenser comprises a syringe (52), a piston (56) that moves inside the syringe (52), and a tip-connecting part (51) for connecting the syringe (52) with a tip (53). The tip-connecting part (51) comprises: a first flow channel (61); a second flow channel (62); two grooves (54a) and (54b), which are each provided over the entire circumference of the side surface of the distal end where the tip (53) is to be installed and are mutually separated in the tip (53) insertion direction; and elastic bodies (55a) and (55b), which are respectively provided in the two grooves (54a) and (54b). The first flow channel (61) extends in the movement direction of the piston (56) and passes through the tip-connecting part (51). The second flow channel (62) is separated from the first flow channel (61), and one end is exposed between the two grooves (54a) and (54b).

5 Claims, 6 Drawing Sheets

(56) References Cited

U.S. PATENT DOCUMENTS

2009/0117010 A1\* 5/2009 Bjorson ............... G01F 23/185
422/400
2011/0182781 A1\* 7/2011 Dzuong ............... B01L 3/0217
422/501

OTHER PUBLICATIONS

International Search Report issued in Patent Application No. PCT/JP2020/011545 dated Jun. 2, 2020.

\* cited by examiner

DISPENSER

TECHNICAL FIELD

The present disclosure relates to a dispensing apparatus that sucks and injects various liquids using disposable tips and is required in, for example, cultivation processes in bio-related technology or manufacturing processes of pharmaceutical products.

BACKGROUND ART

As a liquid dispensing apparatus used in, for example, cultivation processes in bio-related technology or manufacturing processes of pharmaceutical products, an apparatus using a disposable tip is conventionally known (see, for example, Patent Literature (hereinafter, abbreviated as PTL) 1).

Figure 6:
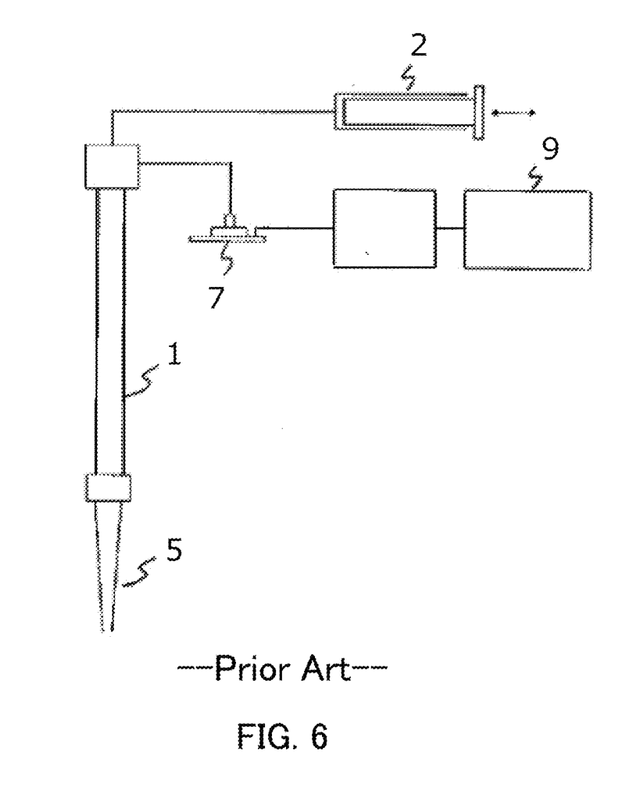
FIG. 6 illustrates a conventional dispensing apparatus.

FIG. 6 illustrates a conventional dispensing apparatus described in PTL 1.

The dispensing apparatus is composed of disposable tip 5, nozzle shaft 1 to which disposable tip 5 can be attached, and a volume change generating apparatus 2 that imparts a volume change for drawing and discharging a liquid.

The dispensing apparatus also includes pressure detector 7 disposed between disposable tip 5 and volume change generating apparatus 2 and controller 9. After disposable tip 5 is attached to the front edge of nozzle shaft 1, controller 9 controls the dispensing apparatus to draw or discharge a gas through nozzle shaft 1 before drawing a liquid sample. Such a configuration allows the determination of the attachment or detachment of disposable tip 5 or the quality of disposable tip 5 based on the pressure detected by pressure detector 7 when the gas is drawn or discharged through nozzle shaft 1.

CITATION LIST

Patent Literature

PTL 1
Japanese Patent Application Laid-Open No. H9-257805

SUMMARY OF INVENTION

Technical Problem

When disposable tip 5 is attached, a gas should be actually drawn or discharged from disposable tip 5 for determining the quality of disposable tip 5 in the conventional apparatus. This configuration may disadvantageously increase the deterioration rate of disposable tip 5.

The present disclosure is made for addressing the above disadvantage in the conventional apparatus. An object of the present disclosure is to provide a dispensing apparatus capable of determining the state of attachment or detachment of a tip without increasing the deterioration rate of the tip.

Solution to Problem

For achieving the above object, a dispensing apparatus of the present disclosure includes a syringe; a piston that moves inside the syringe; and a tip connection part that connects the syringe with a tip, wherein the tip connection part includes a first channel, a second channel, two grooves each provided all around a side surface of a front edge portion of the tip connection part, and an elastic body provided in each of the two grooves, the two grooves being separated from each other in an insertion direction of the tip, the front edge portion being a portion to which the tip is to be attached, the first channel extends in a moving direction of the piston and passes through the tip connection part, and the second channel is separated from the first channel and a first end of the second channel is exposed between the two grooves.

Advantageous Effects of Invention

The dispensing apparatus of the present disclosure is capable of determining the state of attachment or detachment of a tip without increasing the deterioration rate of the tip.

DESCRIPTION OF EMBODIMENTS

Hereinafter, an embodiment of the present disclosure will be described with reference to the drawings.

Figure 1:
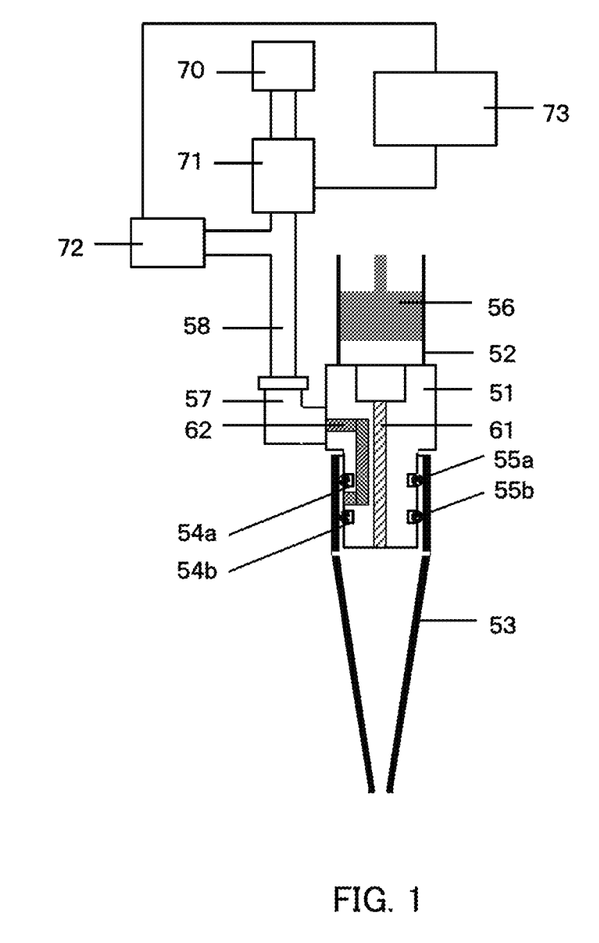
FIG. 1 is a cross-sectional view of a dispensing apparatus being in a state in which a tip is properly attached to a tip connection part of the dispensing apparatus as viewed from the front in the present embodiment.

FIG. 1 is a cross-sectional view of a dispensing apparatus being in a state in which a tip is properly attached to a tip connection part of the dispensing apparatus as viewed from the front in the present embodiment.

Tip connection part 51 is equipped with syringe 52 at its upper portion and tip 53 to be attached at its lower portion.

First channel 61 and second channel 62 are provided inside tip connection part 51.

The front edge portion of tip connection part 51 is cylindrical, and tip 53 is to be attached to the front edge portion. Two annular grooves 54a and 54b are provided all around the side surface (i.e., over the entire circumference of the side surface) of this front edge portion in such a way that the grooves are separated from each other in the insertion direction of tip 53 (vertical direction in the drawing of FIG. 1). Elastic bodies 55a and 55b that fit into these grooves 54a and 54b are attached to grooves 54a and 54b, respectively.

Elastic bodies 55a and 55b are selected to have a diameter substantially the same as the inner diameter of tip 53 to be attached.

Syringe 52 and piston 56 are disposed on the same axis.

First channel 61 is for drawing a sample into and discharging the sample from tip 53 by air pressure generated by moving piston 56 during dispensing. First channel 61 extends in the moving direction of piston 56 and passes through tip connection part 51. Both ends of first channel 61 are disposed on the axis of syringe 52 and piston 56.

Second channel 62 is separated from first channel 61. One end portion (i.e., the first end portion) of second channel 62 extends perpendicularly to first channel 61, and one end (i.e., the first end) of second channel 62 is exposed between the two circumferential grooves 54a and 54b at the front edge portion of tip connection part 51.

The other end (i.e., the second end) of second channel 62 is connected to hose 58 via L-shaped joint 57 at the rear edge portion (upper side of the drawing in FIG. 1) in tip connection part 51. This second end needs to be in a position where this end is not blocked by tip 53 when tip 53 is attached to tip connection part 51. Therefore, in the present embodiment, the other end portion (i.e., the second end portion) of second channel 62 is extended in a direction perpendicular to first channel 61 so that the second end (which is attached to hose 58) of second channel 62 opens at the side surface of the rear edge portion of tip connection part 51.

Tip connection part 51 has a shape with a larger diameter in the rear edge portion (upper side of the drawing in FIG. 1) than in the front edge portion (lower side of the drawing in FIG. 1). As a result, the step between the front edge portion and the rear edge portion serves as a stopper, and the stopper regulates the insertion amount of tip 53 relative to tip connection part 51. As the side surface of the rear edge portion of tip connection part 51 is not blocked by tip 53, the second end of second channel 62 is opened on the side surface of the rear edge portion.

At the end of hose 58, air pressure generator 70 (pressure generator), air pressure detector 72 (pressure detector), and valve 71 are attached.

Air pressure generator 70 is, for example, a compressor or a vacuum pump, and can generate a positive pressure in second channel 62 by pressurizing with the compressor and a negative pressure in second channel 62 by drawing with the vacuum pump. As air pressure generator 70, commonly used pressurizing and depressurizing means can be used.

Valve 71 is provided between air pressure generator 70 and tip connection part 51. In general, a situation such that the pressure generated by air pressure generator 70 is constantly supplied is not preferable. By opening the valve 71 when necessary, pressure is supplied to second channel 62.

Air pressure detector 72 is a pressure switch for measuring the air pressure in hose 58. Air pressure detector 72 can not only display the measured air pressure but also set at least two threshold values. Air pressure detector 72 outputs a HIGH or LOW signal depending on whether the measured air pressure is higher or lower than the threshold value.

The dispensing apparatus also includes controller 73. Controller 73 not only controls the opening/closing of valve 71 but also determines the attachment state of tip 53 with respect to tip connection part 51 according to the HIGH/LOW signal output from air pressure detector 72.

Alternatively, air pressure detector 72 may generate an analog signal that correlates with the measured air pressure, and input this analog signal to controller 73. In this case, controller 73 determines the attachment state of tip 53 on tip connection part 51 by comparing the analog signal input from air pressure detector 72 with the threshold value.

The air pressure measured by air pressure detector 72 changes depending on whether or not tip 53 is attached to tip connection part 51, thus the attachment state of tip 53 can be determined. Hereinafter, a method of determining the attachment state of tip 53 based on the air pressure measured by air pressure detector 72 will be described.

A case where tip 53 is properly attached to tip connection part 51 will be described with reference to FIG. 1.

In this case, the outlet (one end, i.e. first end) of second channel 62 exposed between grooves 54a and 54b of tip connection part 51 is blocked by the inner wall of tip 53 and elastic bodies 55a and 55b.

The air pressure measured by the air pressure detector 72 is equivalent to a pressure obtained by reducing the air pressure generated by air pressure generator 70 by the pressure loss due to factors such as minute gaps. The absolute value of the air pressure measured by air pressure detector 72 is thus lower than the absolute value of the air pressure generated by air pressure generator 70.

Figure 2:
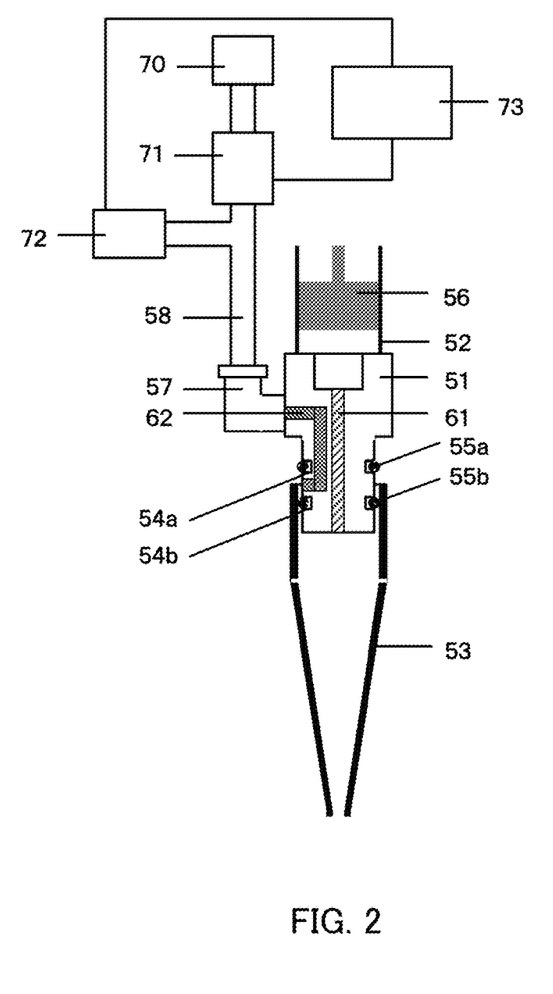
FIG. 2 is a cross-sectional view of the dispensing apparatus being in a state in which a tip is not properly attached to the tip connection part of the dispensing apparatus as viewed from the front in the present embodiment.

A case where tip 53 is not properly attached to tip connection part 51 will be described with reference to FIG. 2. FIG. 2 is a cross-sectional view of the dispensing apparatus being in a state in which a tip is not properly attached to the tip connection part of the dispensing apparatus as viewed from the front in the present embodiment.

In this case, the outlet (one end, i.e. first end) of second channel 62 exposed between grooves 54a and 54b of tip connection part 51 is not completely sealed. In other words, the outlet of second channel 62 is not blocked by the inner wall of tip 53 and elastic bodies 55a and 55b.

The air pressure measured by air pressure detector 72 is equivalent to a pressure obtained by reducing the air pressure generated by air pressure generator 70 by pressure corresponding to the amount of air leaking from the unblocked portion of the outlet of second channel 62.

Specifically, the absolute value of the air pressure measured by air pressure detector 72 in the state of FIG. 2 is lower than the absolute value of the air pressure generated by air pressure generator 70, and also lower than the absolute value of the air pressure measured by air pressure detector 72 in the proper attachment state illustrated in FIG. 1.

Figure 3:
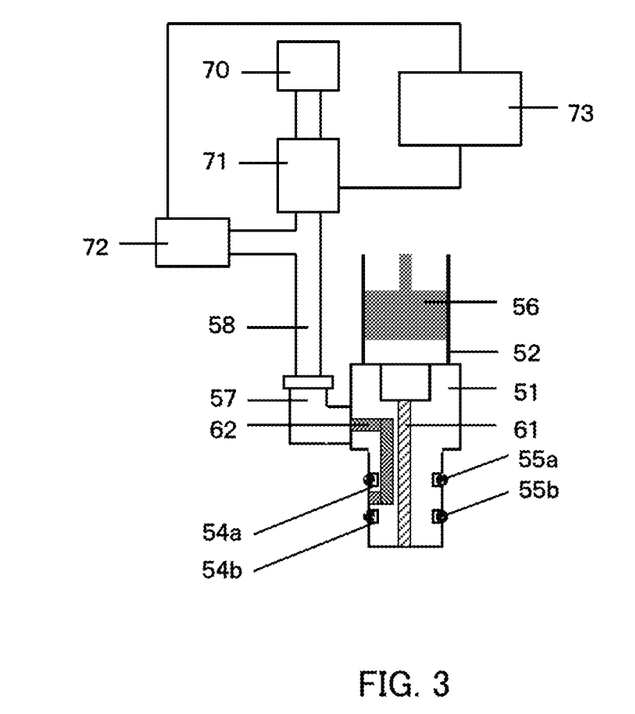
FIG. 3 is a cross-sectional view of the dispensing apparatus being in a state in which a tip is not attached to the tip connection part of the dispensing apparatus as viewed from the front in the present embodiment.

A case where tip 53 is not attached to tip connection part 51 will be described with reference to FIG. 3. FIG. 3 is a cross-sectional view of the dispensing apparatus being in a state in which tip 53 is not attached to tip connection part 51 of the dispensing apparatus as viewed from the front in the present embodiment.

In this case, the outlet (one end, i.e. first end) of second channel 62 exposed between grooves 54a and 54b of tip connection part 51 becomes completely open.

The air pressure measured by air pressure detector 72 is equivalent to a pressure obtained by reducing the air pressure generated by air pressure generator 70 by pressure corresponding to the amount of air leaking from the outlet of second channel 62.

Specifically, the absolute value of the air pressure measured by air pressure detector 72 in the state of FIG. 3 is lower than the absolute value of the air pressure generated by air pressure generator 70, and further, lower than the absolute value of the air pressure measured by air pressure detector 72 in the state of FIG. 2.

The flow for determining the pattern of the above attachment state will be described.

First, two threshold values, namely the first and second threshold values, are set for the determination by using air pressure.

The first threshold value is for determining the state in which tip 53 is properly attached to tip connection part 51, as described above.

The second threshold value is for determining the state in which tip 53 is not attached to tip connection part 51, as described above.

The first and the second threshold values can be determined according to the theory of statistics as follows.
1. Tip 53 is attached to tip connection part 51, and the state is checked.
2. When the tip is attached properly, the absolute value Pci of the air pressure at the time of attachment at the i-th trial is recorded.
3. Tip 53 is detached from tip connection part 51.
4. The absolute value Psi of the air pressure at the time of detachment at the i-th trial is recorded.
5. Steps 1 to 4 are repeated n times.
6. The average Pcave and standard deviation Pcdev of the recorded values Pc1, Pc2, . . . , Pcn of the air pressure in the state where tip 53 is properly attached to tip connection part 51 are calculated.
7. The average Psave and standard deviation Psdev of the recorded values Ps1, Ps2, . . . , Psn of the air pressure in the state where tip 53 is not attached to tip connection part 51 are calculated.
8. The first threshold value is determined by the following equation (1):

First threshold value=Average Pcave of the air pressure in the properly attached state−Standard deviation Pcdev of the air pressure in the properly attached state      Equation (1).

9. The second threshold value is determined by the following equation (2):

Second threshold value=Average Psave of the air pressure in the not attached state+Standard deviation Psdev of the air pressure in the not attached state      Equation (2).

The first and the second threshold values determined in this way can be interpreted as follows.

Even in the state of tip 53 being properly attached to tip connection part 51, the probability that the air pressure in this state falls below the first threshold value is approximately 15.966%.

Even in the state of tip 53 being not attached to tip connection part 51, the probability that the air pressure in this state exceeds the second threshold value is approximately 15.966%.

The first or second threshold value, or both may be a value obtained by multiplying the threshold value calculated by the above equation (1) or the above equation (2) by any appropriate safety factor. Using the safety factor in this way can improve the accuracy of determining the attachment state of tip 53.

Figure 4:
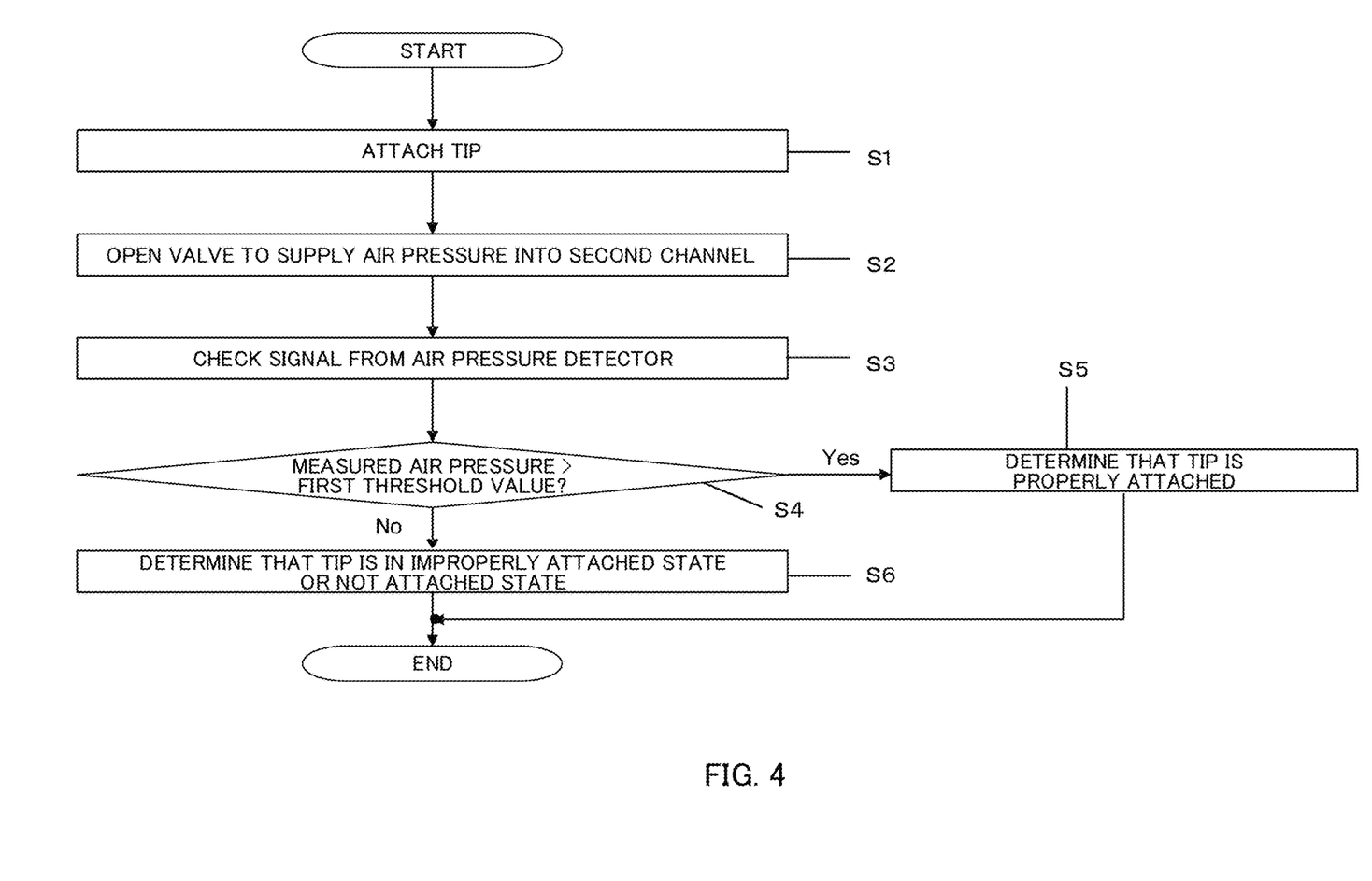
FIG. 4 is a flowchart for determining the attachment state of a tip when the tip is attached to the tip connection part in the present embodiment.

A flow for determining the attachment state of tip 53 when tip 53 is attached to tip connection part 51 will be described with reference to FIG. 4. FIG. 4 is a flowchart for determining the attachment state of tip 53 when tip 53 is attached to tip connection part 51 in the present embodiment.

Tip 53 is attached to tip connection part 51 (S1).

Controller 73 opens valve 71 to supply pressure to second channel 62 (S2).

Controller 73 checks the signal output from air pressure detector 72 (S3).

When the air pressure in the current state based on the signal output from air pressure detector 72 exceeds the first threshold value (Yes in S4), controller 73 determines that tip 53 is properly attached (S5).

When the air pressure measured by air pressure detector 72 is equal to or less than the first threshold value (No in S4), controller 73 determines that tip 53 is in an improperly attached state (i.e., the attachment state of the tip is poor) or is not attached (S6).

From the above flow, the attachment state when tip 53 is attached to tip connection part 51 can be determined.

Improper attachment may result in a problem such as decrease of liquid volume accuracy due to air leakage or liquid leakage during dispensing. For attaching tip 53 to tip connection part 51, it is thus desirable to determine the attachment state by using the first threshold value in order to reliably prevent improper attachment.

Figure 5:
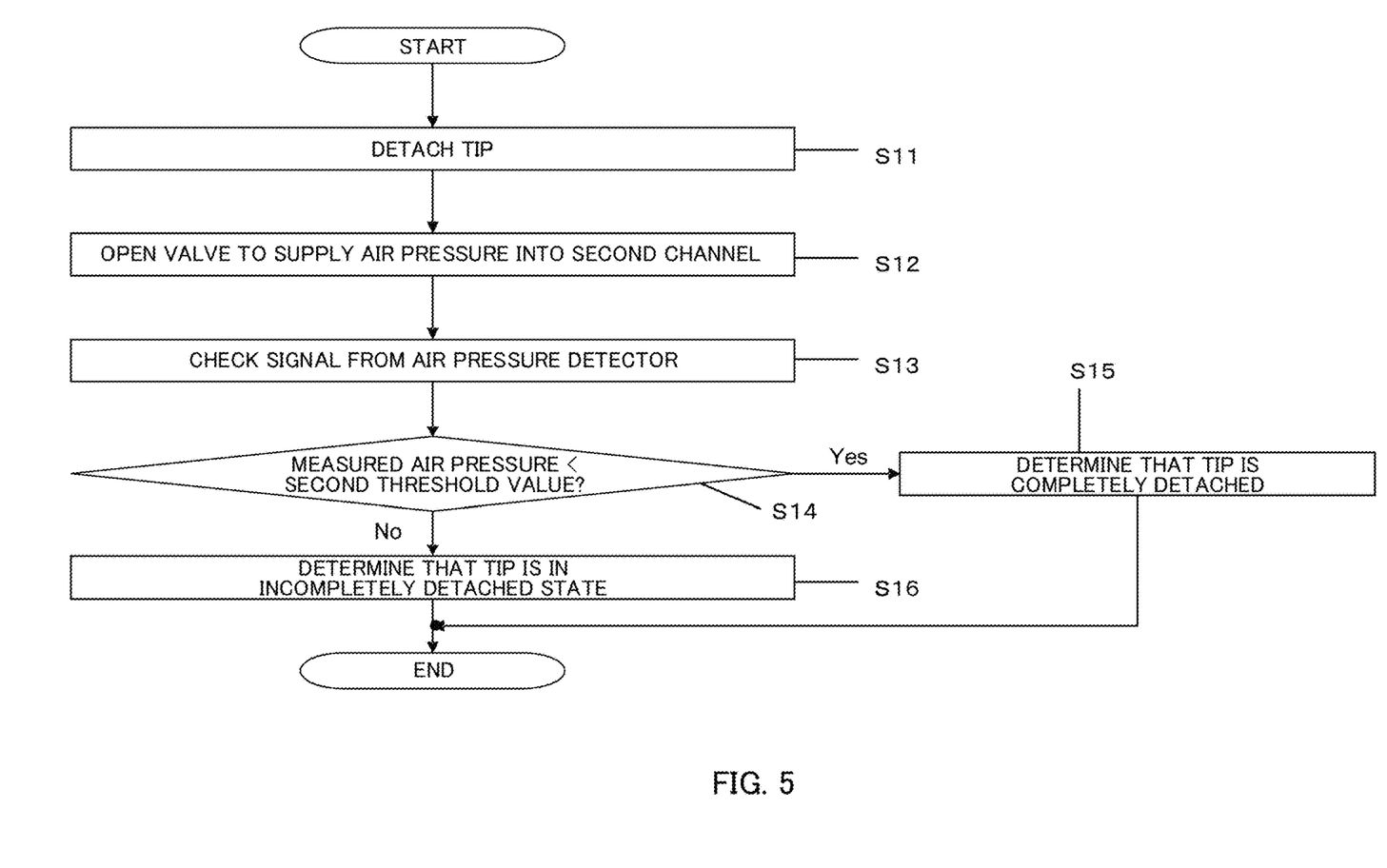
FIG. 5 is a flowchart for determining the detachment state of a tip when the tip is detached from the tip connection part in the present embodiment.

A flow for determining the detachment state of tip 53 when tip 53 is detached from tip connection part 51 will be described with reference to FIG. 5. FIG. 5 is a flowchart for determining the detachment state of tip 53 when tip 53 is detached from tip connection part 51 in the present embodiment.

Tip 53 is detached from tip connection part 51 (S11).

Controller 73 opens valve 71 to supply pressure to second channel 62 (S12).

Controller 73 checks the signal output from air pressure detector 72 (S13).

When controller 73 determines based on the signal output from air pressure detector 72 that the air pressure falls below the second threshold value (Yes in S14), controller 73 determines that tip 53 is completely detached (S15).

When the air pressure measured by air pressure detector 72 is equal to or more than the second threshold value (No in S14), controller 73 determines that tip 53 is in an incomplete detachment state (detachment failure state, namely incompletely detached state) (S16).

From the above flow, the detachment state when tip 53 is detached from tip connection part 51 can be determined.

When there is a detachment failure, the presence of undetached tip 53 may cause work failure when a next dispensing operation is performed. For detaching tip 53 from tip connection part 51, it is thus desirable to determine the detachment state by using the second threshold value in order to reliably prevent detachment failure.

Elastic bodies 55a and 55b in contact with tip 53 are rubbed by the inside of tip 53 each time tip 53 is attached or detached, and therefore deteriorates after the attachment and detachment of tip 53 is repeated a certain number of times.

Deterioration of elastic bodies 55a and 55b may lead to the air pressure measured by air pressure detector 72 not exceeding the first threshold value during the attachment of tip 53 to tip connection part 51, even when tip 53 is properly attached.

Then, when controller 73 makes a determination such that tip 53 is in an improperly attached state (i.e., the attachment state of the tip is poor) or is not attached for a certain number of times in a row, controller 73 may determine that elastic bodies 55a and 55b have deteriorated.

The embodiment of present disclosure enables determination of the attachment or detachment state of tip 53 after tip 53 is attached or detached without actually drawing or discharging fluid such as air from the front end of tip 53. Therefore, the attachment or detachment state of tip 53 can be determined without increasing the deterioration rate of tip 53.

This application is entitled to and claims the benefit of Japanese Patent Application No. 2019-056950 filed on Mar. 25, 2019, the disclosure of which including the specification, claims, drawings and abstract is incorporated herein by reference in its entirety.

INDUSTRIAL APPLICABILITY

The dispensing method and the dispensing apparatus performing the method of the present disclosure enable accurate determination of whether a tip is attached or not, or whether the attachment is proper or not, without actually drawing or discharging fluid from the tip immediately after attaching or detaching the tip, and without increasing the deterioration rate of tip 53. Therefore, the dispensing apparatus of the present disclosure can be applied to an automated dispensing process in cultivation processes in bio-related technology or manufacturing processes of pharmaceutical products.

REFERENCE SIGNS LIST

51 Tip connection part
52 Syringe
53 Tip
54a Groove
54b Groove
55a Elastic body
55b Elastic body
56 Piston
57 L-shaped joint
58 Hose
61 First channel
62 Second channel
70 Air pressure generator (Pressure generator)
71 Valve
72 Air pressure detector (Pressure detector)
73 Controller

What is claimed is:

1. A dispensing apparatus, comprising:
a syringe;
a piston that moves inside the syringe; and a tip connection part that connects the syringe with a tip, wherein
the tip connection part includes a first channel, a second channel, two grooves each provided all around a side surface of a front edge portion of the tip connection part, and an elastic body provided in each of the two grooves in contact with the tip all around the tip, the two grooves being separated from each other in an insertion direction of the tip, the front edge portion being a portion to which the tip is to be attached,
the first channel extends in a moving direction of the piston and passes through the tip connection part,
the second channel is separated from the first channel, and a first end of the second channel is exposed between the two grooves, wherein a second end of the second channel does not interfere with the tip when the tip is attached to the tip connection part,
wherein the dispensing system further includes:
a pressure generator,
a valve,
a pressure detector, and
a controller programmed to control the valve to;
apply a positive pressure or a negative pressure from the second end of the second channel into the second channel,
obtain a pressure in the second channel detected by the detector, and
determine an attachment state of the tip based on the pressure in the second channel measured by the pressure detector.

2. The dispensing apparatus according to claim 1, wherein:
the controller determine the attachment state of the tip by comparing the pressure measured by the pressure detector with a pressure applied by opening the valve.

3. The dispensing apparatus according to claim 2, wherein:
when the tip is attached to the tip connection part, the controller is programmed to determine that the tip is properly attached to the tip connection part when the pressure measured by the pressure detector exceeds a first threshold value.

4. The dispensing apparatus according to claim 2, wherein:
when the tip is detached from the tip connection part, the controller programmed to determine that the tip is completely detached from the tip connection part when the pressure measured by the pressure detector falls below a second threshold value.

5. The dispensing apparatus according to claim 2, wherein:
when the controller determines that the attachment state of the tip to the tip connection part is poor for a certain number of times in a row, the controller programmed to determine that the elastic body has deteriorated.

* * * * *